May 14, 1968 P. J. BILY 3,382,893
FLUID TRANSFERRING APPARATUS
Filed Feb. 8, 1962 4 Sheets-Sheet 1
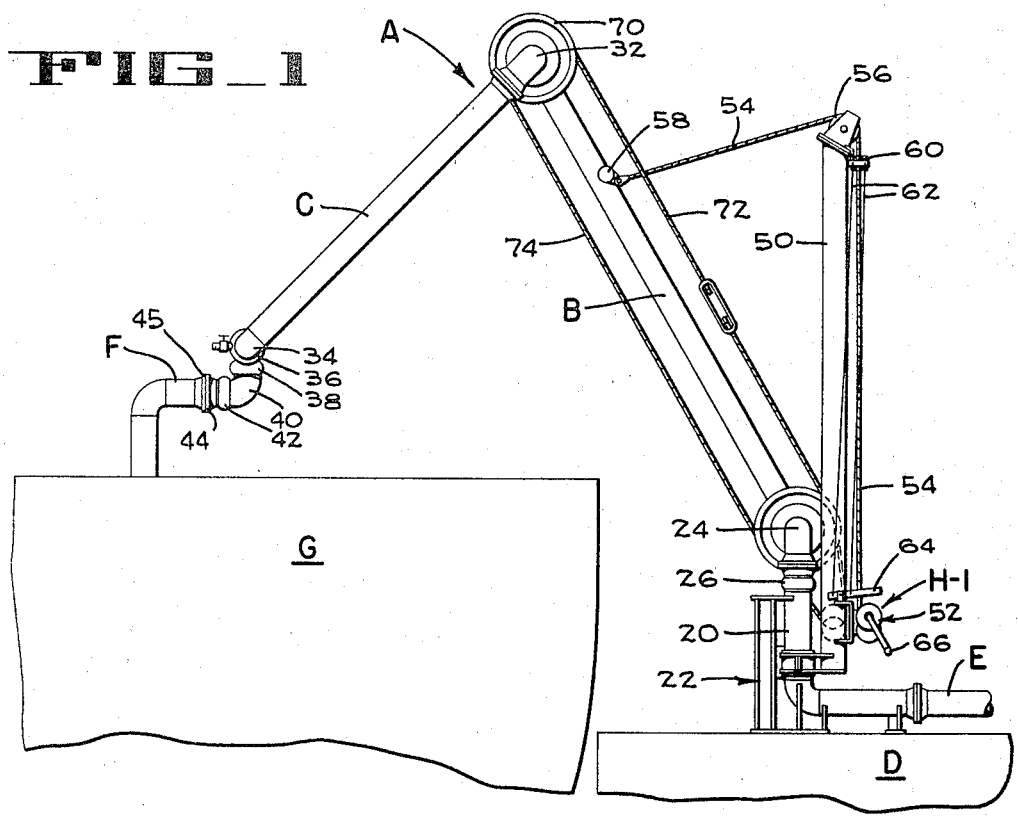
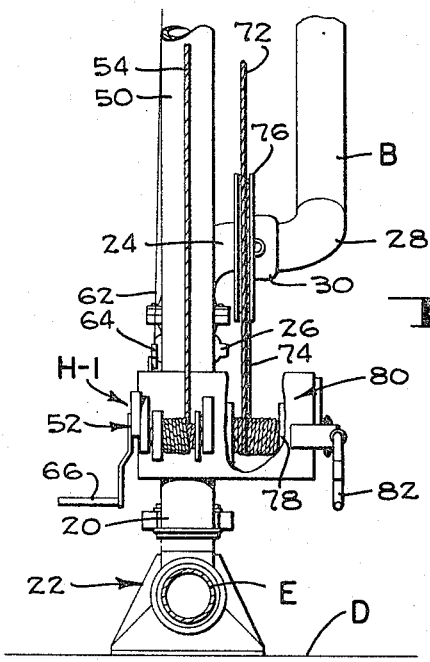
INVENTOR
PETER J. BILY
BY Hans G. Hoffmeister
ATTORNEY

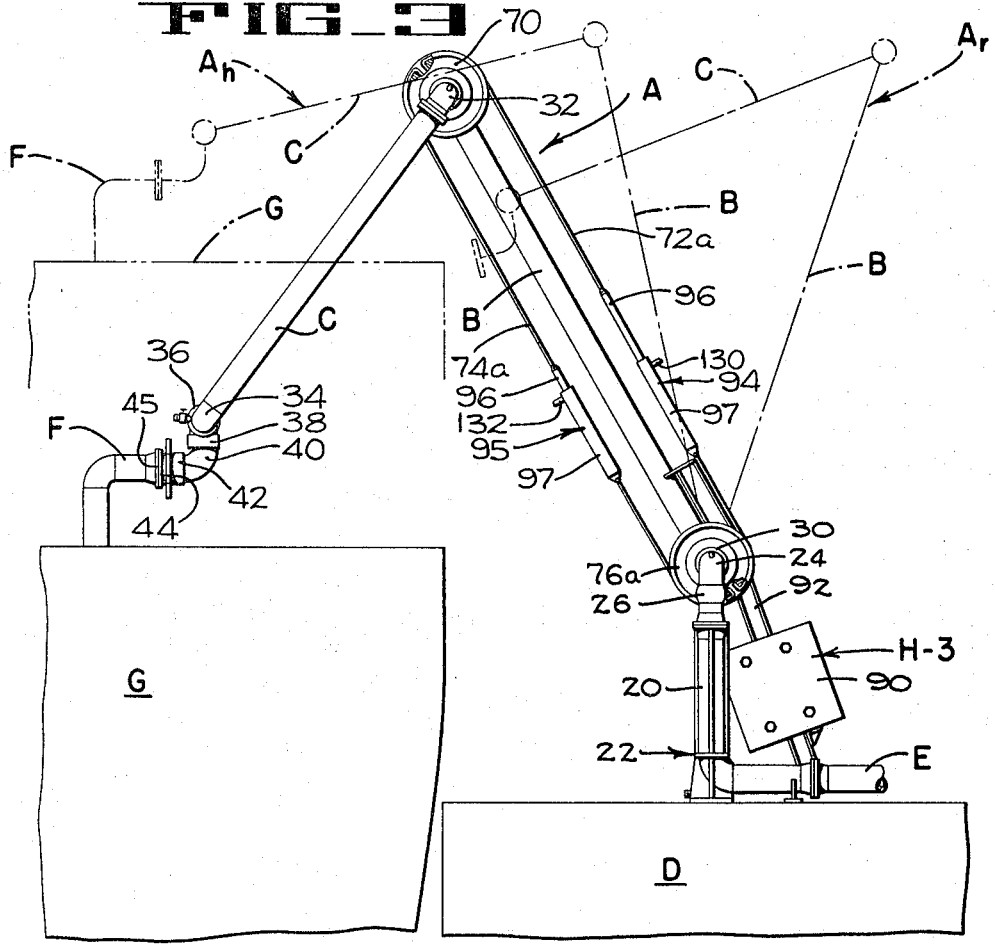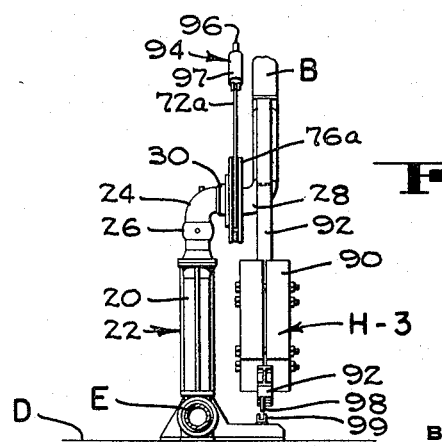

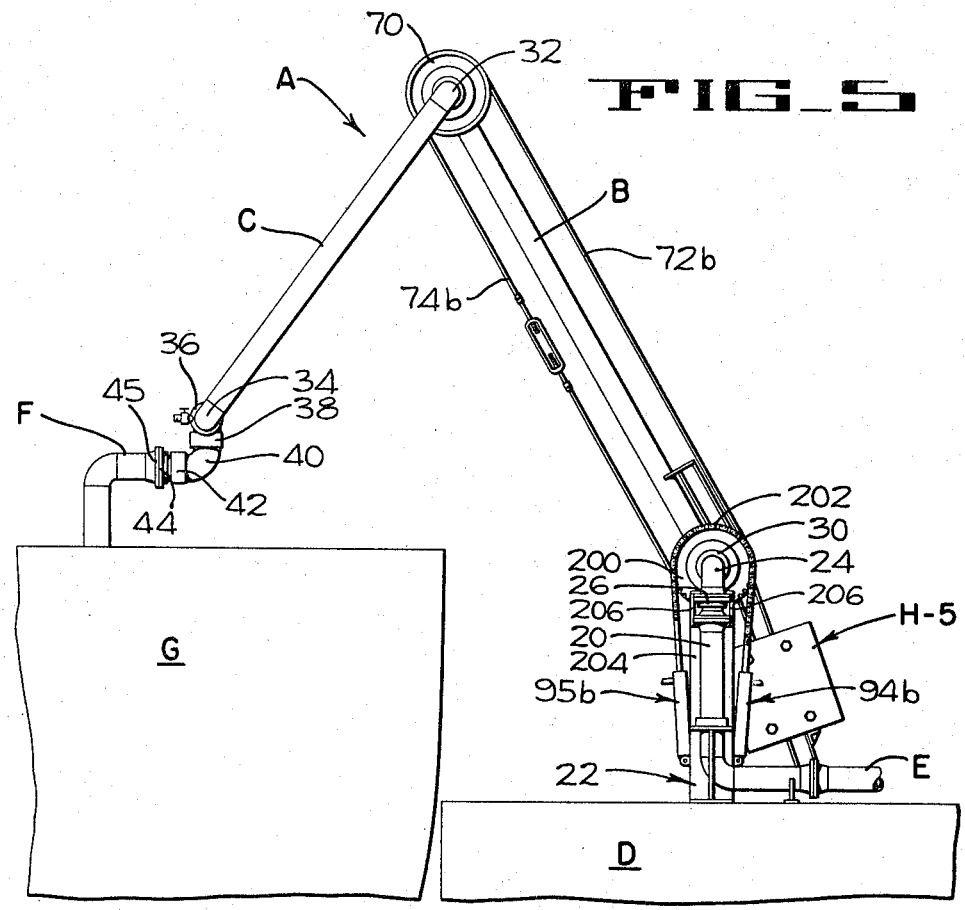
FIG_5
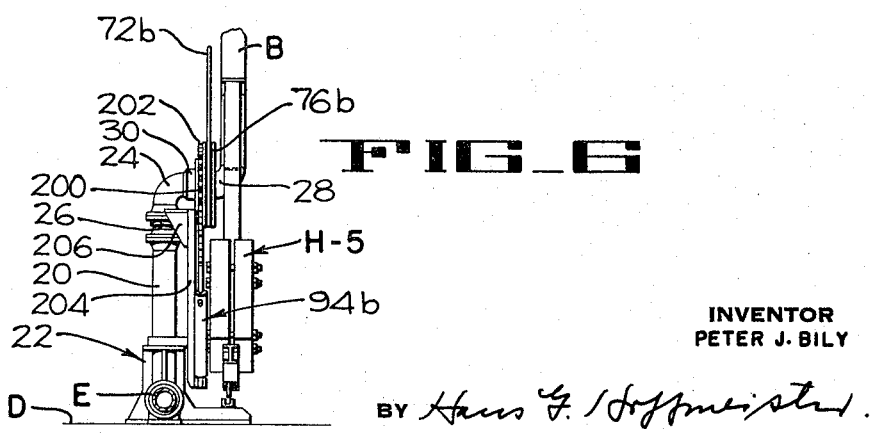
FIG_6
INVENTOR
PETER J. BILY
BY Hans G. Hoffmeister
ATTORNEY

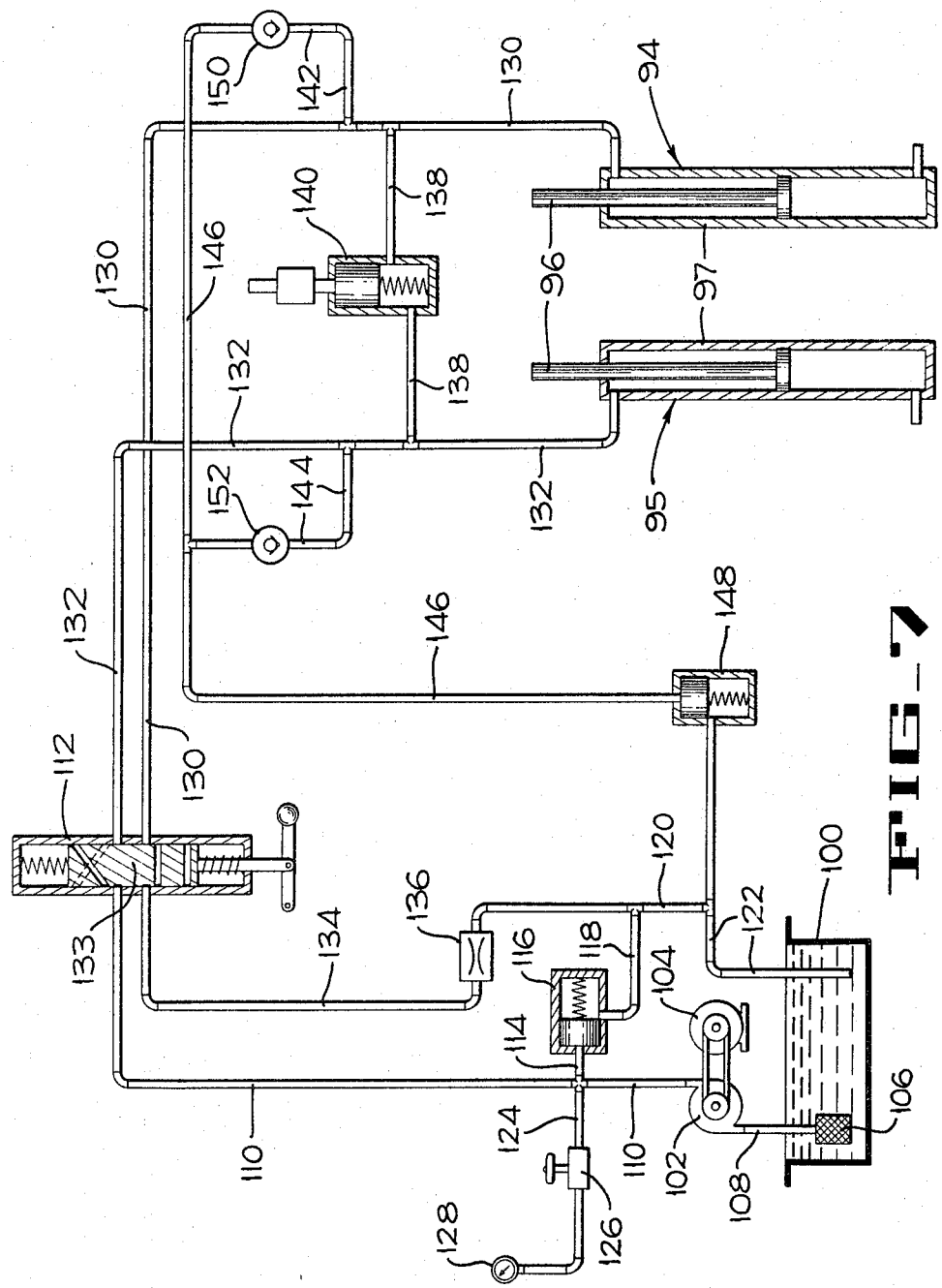

United States Patent Office 3,382,893
Patented May 14, 1968

3,382,893
FLUID TRANSFERRING APPARATUS
Peter J. Bily, Sunset Beach, Calif., assignor to FMC Corporation, San Jose, Calif., a corporation of Delaware
Filed Feb. 8, 1962, Ser. No. 171,841
20 Claims. (Cl. 137—615)

This invention relates to fluid handling equipment, and more particularly to apparatus for transferring fluid from one fluid handling means to another.

An object of the invention is to provide an improved fluid transferring apparatus.

Another object is to provide improved and simplified apparatus for temporarily establishing fluid conveying interconnection between separate fluid containers without requiring exact spacing between the containers, thereby adapting the apparatus for use in loading and unloading fluid carrying vehicles.

Another object is to provide improved apparatus adapted to maintain efficient fluid conveying communication between fluid delivering and fluid receiving conduits between which relative motion is apt to occur, thus particularly adapting the apparatus of the invention for such uses as supplying fuel oil or water to ships, and loading and unloading marine tankers and oil or water carrying barges.

Another object of the present invention is to provide improved apparatus for temporarily establishing fluid conveying communication between separate fluid conduits, such as an oil supply line on a dock and an oil receiving line on a barge, which apparatus is maneuverable to and from operative positions easily, quickly, and without the manhandling or hazards of injury to personnel or equipment that characterizes the heavy and cumbersome flexible hoses commonly employed for loading and unloading liquid transporting marine carriers.

Another object is to provide a tanker or barge loading and unloading apparatus including a tubular conduit made up of a plurality of pivotally interconnected rigid tubing sections and so arranged that a lone operator on the dock can quickly and with little effort maneuver the distal end of the conduit to a position so close to a selected conduit on a tanker or barge that they can easily be coupled together.

Another object is to provide improved fluid handling apparatus for marine use, including a plurality of pivotally interconnected rigid tubes adapted to be mounted on a loading wharf or pier and so supported and operated that when not in use it can be disposed in an elevated position out of the way of traffic.

Another object of the invention is to provide an improved fluid handling hose construction including rigid, pivotally interconnected tubing sections movable optionally to an extended operative position, or to an inoperative retracted position, and including means for counterbalancing the movable parts of the apparatus in any position throughout its full range of movement.

Another object is to provision of a fluid handling apparatus including two rigid, swivelly interconnected tubes, each of which is independently maneuverable relatively to the other.

Another object of the invention is to provide a liquid cargo handling apparatus including inboard and outboard tubing sections, wherein the inboard section can be swung about a horizontal axis to and from a retracted or idle position without disturbing the attitude of the outboard section, and wherein the outboard section can be swung about a horizontal axis adjacent the free or outer end of the inboard section.

Another object is the provision of a multi-section tubular liquid cargo handling apparatus constituting an improvement over that disclosed in United States Patent No. 2,927,607 issued Mar. 8, 1960 to P. J. Bily.

These and other objects and advantages of the present invention will become apparent from the following description and the accompanying drawings in which:

FIG. 1 is a side elevation of fluid transferring apparatus embodying the invention.

FIG. 2 is a rear elevation of the apparatus disclosed in FIG. 1.

FIG. 3 is a side elevation of another apparatus embodying the invention.

FIG. 4 is a rear elevation of the apparatus disclosed in FIG. 3.

FIG. 5 is a side elevation of another apparatus embodying the invention.

FIG. 6 is a rear elevation of the apparatus disclosed in FIG. 5.

FIG. 7 is a schematic diagram of the hydraulic circuit used in the embodiments disclosed in FIGS. 3 and 5, respectively.

Each of the illustrated embodiments of the present invention is a fluid transferring apparatus comprising an articulated tubular conduit A (FIGS. 1, 3 and 5) including rigid inboard and outboard tubes B and C, respectively, arranged substantially in end-to-end relation. The inner section B of the conduit A is carried by a suitable supporting structure such as a loading or unloading dock D for tank trucks or marine vessels. The inner conduit section B is pivotally mounted for universal movement about intersecting horizontal and vertical axes adjacent the inner end of the section so that it serves as a supporting boom for the outer conduit section C, which is pivotally connected to the outer end of the inner section B for movement relative thereto in a vertical plane. A pipe or other tubular conduit E is in constant communication with the conduit A to supply fluid thereto or to receive fluid therefrom, depending upon whether the apparatus is used for loading or unloading operations. Since the outer conduit section C is pivotally connected to the outer end of the inner section B for movement about a horizontal axis, and since means are provided on the dock, not only for moving the inboard conduit section B about the mutually perpendicular axes of its universal mounting, but also for pivoting the outboard section C relatively to the inner section B, a lone operator on the dock can maneuver the conduit into a position wherein it is an easy matter for one person to couple the distal end of the conduit A to a selected conduit F (FIGS. 1, 3 and 5) on a barge G or other vessel moored to the dock.

In all of the illustrated embodiments of the invention, the conduit E terminates in a vertically disposed riser pipe 20 which is supported on the dock D by a frame 22. A 90° elbow 24 is connected to the upper end of the riser pipe 20 by a vertical swivel pipe joint 26. (Throughout this description of the invention, the designation of a swivel pipe joint as being horizontal or vertical refers to the direction of its axis about which one of its relatively movable parts can rotate with respect to the other.) A second 90° elbow 28 is connected at one of its ends to the elbow 24 by a horizontal swivel pipe joint 30, and the other end of the elbow 28 is connected to the inboard section B of the conduit A. Thus the conduit section B is mounted for universal pivotal movement, i.e., freedom of movement about vertically perpendicular axes adjacent the inner end of the section B. A 90° elbow (not shown) is connected to the outer end of the conduit section B, and is connected by a horizontal swivel pipe joint (not shown) to an elbow 32 which is connected to the inner end of the outer conduit section C. Thus, the outer conduit section C is permitted pivotal movement within a vertical plane about the horizontal axis of the interconnecting swivel joint.

Maneuvering of the conduit A so that its distal end is positioned adjacent the conduit F on the barge, as well as maneuvering the conduit to its retracted position, is facilitated by a mechanism H–1, H–3 or H–5 (FIGS. 1, 3 and 5, respectively) that holds the apparatus in any position to which it may be adjusted. Nevertheless, in each instance the holding mechanism is yieldable and the swivel joints that interconnect the two conduit sections as well as those that pivotally support the inner section and connect the same to the stationary conduit E on the dock D, are freely movable. Therefore, the apparatus is enabled to accommodate itself to any normal movements of the barge relative to the dock while a loading or unloading operation is in progress, so that rising or falling tide, movement of the ship along or toward or away from the dock, and changes in the vessel's freeboard due to increased or decreased extent of loading will have no harmful effect upon the apparatus or upon its efficiency in conducting fluid between the dock and the vessel. The outer end of the outer conduit section C is connected to a 90° elbow 34, which is in turn connected by a horizontal swivel pipe joint 36 to a second elbow, not shown. Said second elbow is connected by a swivel joint 38 to a third elbow 40 which is connected by another pipe swivel joint 42 to a flange connector 44. Thus it can be seen that the open end of the flange connector 44 is universally connected to the outer end of the conduit section C by means of the swivel joints 36 and 38 so that the open end of the flange coupling 44 can be presented in any desired orientation. The swivel joint 42 permits rotation of the flange coupling 44 to match up the bolt holes with a companion flange 45 on the conduit F fixed to the ship or barge G.

Part of the weight of the articulated conduit A and of mechanism yet to be described mounted thereon, is supported directly upon the riser pipe 20 through the horizontal swivel joint 30. In the embodiment of the invention illustrated in FIGS. 1 and 2, the part of that weight which tends to rotate the conduit A is supported by the hereinbefore mentioned maneuvering means H–1, which includes a mast 50 fixed to the frame 22 and a winch assembly 52 mounted on the mast having a cable 54 which extends upward over a sheave 56 rotatably mounted at the upper end of the mast 50 and connected to a fitting 58 fixed to the inner section B of the articulated conduit A. A cable lock assembly 60 is fixed to the mast 50 adjacent the sheave 56 and is actuated by means of cables 62 connected to a hand lever 64 adjacent the winch 52. With the lever 64 in one position, the cable 54 can run freely through the lock assembly 60; whereas when the lever 64 is shifted to another position, the assembly 60 grips the cable 54 and thereby becomes effective to support the inboard conduit section B. When the handle 66 of the winch is rotated to wind the cable 54, the articulated conduit A is swung upward and inward toward the mast 50. Conversely, when the handle 66 is rotated in the opposite direction to unwind the cable 54, the articulated conduit assembly A is permitted to move downward and outward from the mast 50 under the influence of gravity.

The outer hose section C is moved relatively to the inner section B by means of a sheave 70 fixed to the elbow 32 which interconnects the two conduit sections B and C. Two cables 72 and 74 are dead-ended on the sheave 70 and extend inward over a freely rotatable sheave 76, which sheave is mounted on the horizontal portion of the elbow 24 which mounts the inboard swivel joint 30 on the riser pipe 20. The inner ends of the cables 72 and 74 are wound in opposite directions on the drum 78 of a second winch 80 mounted on the mast 50. When the handle 82 of the winch 80 is turned, one of the cables 72 will be wound onto the drum 78 at the same time as the other cable 74 is unwound from said drum, thus rotating the sheave 70 in one direction or the other, depending upon the direction in which the handle 82 is turned, thereby pivoting the outboard conduit section C relatively to the inner section B.

From the structure thus described it may be seen that a single operator on the dock D by the proper manipulation of the two winches 52 and 80, and by swinging the whole assembly about the axis of the vertical swivel joint 26, can position the distal end of the outer conduit section C in any desired location within the reach of the apparatus. Then, since the outer conduit section C hangs freely from the outer end of the inboard section B, and since the entire assembly supported by the swivel joint 26 is free to turn about the vertical axis thereof, it is an easy matter for a person on the barge G to place the flange connector 44 at the free end of the outboard conduit section C in position for connection to the companion flange 45 on the conduit F and to couple the two flanges 44 and 45 together, thus placing the apparatus in readiness for loading or unloading the barge.

From the foregoing description of the apparatus and its manner of operation, it is clear that since the sheave 70 can easily be held motionless while the inner conduit member B is pivoted about the horizontal axis of the inboard swivel joint 30, the outer conduit member C can be retained in any selected attitude with respect to the horizontal while the angularity of the inner conduit member B with respect to the horizontal is altered. Thus the apparatus of the present invention can, when occasion requires, be operated in the same manner as the liquid cargo handling apparatus disclosed in the aforesaid Patent No. 2,927,607. However, the apparatus of the present invention possesses the additional advantage that the attitude of the outer conduit member is variable independently of movement of the inner conduit member, with the result that the maneuverability of the apparatus of this invention is greatly increased in respect of both range, or reach, of the apparatus and convenience in the operation thereof.

After the connection to the ship's flange 45 has been made up, the cable lock 60 should be released, this being accomplished by appropriate movement of the hand lever 64 as above described. The apparatus is then in a "freewheeling" condition, i.e., the outer end of the conduit A is free to follow any movements of the barge which proper mooring of the barge to the dock will permit, since no material resistance is presented to pivoting action of the vertical swivel joint 26 or of the horizontal swivel joints 30 and 36, as well as the horizontal swivel joint (not shown) which interconnects the inboard and outboard conduit sections B and C.

Turning now to the modification illustrated in FIGS. 3 and 4, most of the elements shown therein are the same as corresponding elements shown in FIGS. 1 and 2 and, hence, are given the same reference numerals. One difference between the first described embodiment and that of FIGS. 3 and 4 is that the mast 50, the winch 52, and the cable 54 which, in the former, hold the articulated conduit A in selected position are replaced in the latter by a counterweight 90 mounted on a beam 92, fixed to the inner conduit section B. The weight 90 is adjusted along the beam 92 so that it just counterbalances the dead weight of the articulated arm A and the parts carried thereby.

A further difference in this modification is that the mechanism for maneuvering the outer section C of the articulated conduit A relatively to the inner section B has been changed by making the inner sheave 76a a fixed sheave, i.e., fixed with respect to the elbow 24. The cables 72a and 74a which correspond to the cables 72 and 74 of the prior modification, are dead-ended to the sheave 76a as well as to the sheave 70. Two fluid operated pulling engines 94 and 95, each comprising a ram 96 reciprocable within a hydraulic cylinder 97, are interposed one within each of the cables 72a and 74a. By means of this arrangement, the effective length of either cable may be shortened by actuating the respective pulling engine while permitting the other engine to exhaust as the effective length of its associated cable increases. Thus, power means are provided to effect rotation of the sheave 70 to change the attitude of the outer conduit section C with respect to the inner section B.

Since the turning moment resulting from the attitude of the section C is transmitted by means of the sheave 70 and the cable 72a directly to the stationary sheave 76a, the attitude of the outer section C of the conduit A with respect to the inner section B thereof does not have any effect on the counterbalance H–3. Thus, the assembly remains balanced at all times regardless of the attitude of the outer section C of the articulated conduit A with respect to the inner section B thereof.

A plate 98 is fixed to the beam 92 in such position that when the conduit A is in its rest position the plate 98 is between the legs of a U-shaped bracket 99. A removable clevis pin (not shown) fits through aligned holes in the plate 98 and bracket 99 to lock the conduit A in this position.

The hydraulic circuit for actuating the pulling engines 94 and 95 to effect changing of the attitude of the outer conduit section C is described in connection with FIG. 7. The hydraulic circuit comprises a reservoir 100 and a pump 102 driven by an electric motor 104. The pump 102 picks up hydraulic fluid through a strainer 106 and an intake pipe 108 and delivers hydraulic fluid under pressure through a tube 110 to a control valve 112. A branch tube 114 and a pressure responsive unloader valve 116 connect the tube 110 through tubes 118, 120 and 122 back to the reservoir 100. A second branch tube 124, connects the tube 110 through a manually operated valve 126 to a pressure gauge 128 to provide visual indication of the pressure being applied to the control valve 112. Tubes 130 and 132 connect two delivery ports of the control 112 with the pulling engines 94 and 95, respectively. When the core 133 of the control valve 112 is moved upward as viewed in FIG. 7, fluid pressure from the line 110 is applied through the line 132 to the pulling engine 95. At the same time, the fluid discharged from the engine 94 through the line 130 is conveyed to a discharge tube 134 and through a restricted orifice 136 and the return tubes 120 and 122 back to the reservoir 100. Similarly, when the core 133 of the control valve 112 is moved downward as viewed in FIG. 7, hydraulic pressure from the supply line 110 is applied through the line 130 to the pulling engine 94 while the fluid discharged from the engine 95 is connected to the discharge line 134 back to the reservoir 100 through the restricted orifice 136.

In order to provide a "freewheeling" connection for the apparatus when the conduit A is connected to a ship or barge adjacent the dock, a by-pass line 138 is connected between the lines 130 and 132. A solenoid actuated valve 140 is inserted in the by-pass line 138. When the valve 140 is open, as shown in FIG. 7, fluid can flow freely between the cylinders 97 of the two engines 94 and 95, with the result that the outboard section C of the conduit A can move about the horizontal axis of its pivotal connection to the inboard section B without any material resistance. The valve 140 must be closed in order to alter the attitude of the section C by means of the hydraulic circuit.

If for any reason movement of the ship relative to the dock should occur while the conduit A is connected to the ship and the valve 140 is closed, any excess pressure built up in the pulling engines 94 and 95 as a consequence of movement of the outboard conduit section C relative to the inboard section B, is vented from the conduit 130 or 132, as the case might be, through a respective relief conduit 142 or 144, to a return conduit 146 and back to the reservoir 100 through an unloader valve 148. It will be noted that the conduits 142 and 144 are provided with check valves 150 and 152, respectively, which prevent communication between the two conduits 130 and 132 during application of pressure therein to manipulate the conduit section C.

Returning now to FIG. 3, the broken center line $A_r$ thereon indicates the rest position into which the conduit A is placed when not in use. The broken line $A_h$ shows how the conduit may be placed to make connection with a ship or barge having a high freeboard adjacent the dock D as indicated by the broken line $G_h$.

In the use of this modification, one operator on the dock may place the articulated conduit B into the desired vertical orientation by manually rotating the same about the horizontal axis on the swivel joint 30 and he may adjust the conduit A horizontally by manually turning the assembly about the vertical axis of the swivel joint 26. Because of the counterbalancing action of the counterweight 90 on the beam 92, the apparatus will stay in any set position in which it is placed. The operator on the dock may vary the attitude of the outer conduit section C by means of the hydraulic circuit described above, to place the flange coupling 44 at the distal end of the conduit section C adjacent the companion flange 45 on the conduit F of the barge or ship G.

Although the modification illustrated in FIGS. 5 and 6 is similar to that of FIGS. 3 and 4, it differs therefrom in the means for manipulating the outer conduit section C. In the modification of FIGS. 5 and 6, the cables 72b and 74b which again are dead-ended on the outer sheave 70 are dead-ended at their inner ends on a rotatable sheave 76b. A sprocket 200 is fixed to the sheave 76b and a chain 202, which is trained around the sprocket 200, is attached to the pistons of two hydraulic pulling engines 94b and 95b which correspond to the pulling engines 94 and 95 of the previous modification. However, instead of being interposed within the cables 72b and 74b, the engines 94b and 95b are pivotally mounted on a plate 204 which is connected by brackets 206 to the elbow 24 above the vertical swivel joint 26. Actuation of the hydraulic engines 94b and 95b effects rotation of the sheave 76b, and through the cables 72b and 74b rotates the sheave 70 to change the attitude of the outer section C of the articulated conduit A. The hydraulic circuit for operating the engines 94b and 95b is the same as that explained above for operating the engines 94 and 95 of the modification illustrated in FIGS. 3 and 4. It will be understood, therefore, that the operation of the embodiment of the invention illustrated in FIGS. 5 and 6 is the same as that described above in connection with the embodiment illustrated in FIGS. 3 and 4.

While certain embodiments of the invention have been shown and described herein, it should be noted that further changes may be made therein without departing from the spirit of the invention as defined in the appended claims.

The invention having thus been described what is believed to be new and desired to be protected by Letters Patent is:

1. Apparatus for conveying fluid from one fluid handling means to another, comprising a rigid inner conduit member, means mounting the inner conduit member for pivotal movement about a horizontal axis, a rigid outer conduit member pivotally connected at one of its ends to the outer end of the inner conduit member for movement about a horizontal axis, and a drive mechanism connected between said mounting means and said outer conduit member for changing the attitude of said outer conduit member with respect to said inner conduit member, said drive mechanism being operable throughout its full range of operation independently of movement of the inner conduit member.

2. Apparatus for conveying fluid from one fluid handling means to another, comprising a rigid inner conduit member, means mounting the inner conduit member for pivotal movement about a horizontal axis adjacent one end of said conduit member, a rigid outer conduit member pivotally connected at one of its ends to the other end of the inner conduit member for movement of said outer conduit member relative to the inner conduit member about a horizontal axis, and a mechanical drive mechanism carried by said mounting means and operable independently of movement of said inner conduit member throughout its full range of operation for changing the attitude of said outer conduit member with respect to said inner conduit member.

3. Apparatus for conveying fluid from one fluid handling means to another, comprising a rigid inner conduit member, means mounting the inner conduit member for pivotal movement about mutually perpendicular axes adjacent one end of said conduit member, a rigid outer conduit member pivotally connected at one of its ends to the other end of the inner conduit member for movement of said outer conduit member relative to the inner conduit member about a horizontal axis, and a fluid operated drive mechanism connected between said mounting means and said outer conduit member for changing the attitude of said outer conduit member with respect to said inner conduit member, said drive mechanism being operable to change the attitude of the outer conduit member to any selected position within its full range of movement relative to the inner conduit member and independently of movement of the inner conduit member.

4. Apparatus for conveying fluid from one fluid handling means to another, comprising a rigid inner conduit member, means mounting the inner conduit member for pivotal movement about a vertical axis and about a horizontal axis, both of said axes being adjacent one end of said conduit member, a rigid outer conduit member pivotally connected at one of its ends to the other end of the inner conduit member for movement of said outer conduit member relative to the inner conduit member about a horizontal axis, and a hydraulic drive mechanism carried by said mounting means and connected to said outer conduit member for changing the attitude of said outer conduit member with respect to said inner conduit member, to any selected position within its full range of movement relative to the inner conduit member and independently of movement of the inner conduit member.

5. Apparatus for conveying fluid from one fluid handling means to another, comprising a rigid inner conduit member, means mounting the inner conduit member for pivotal movement about a first horizontal axis, a rigid outer conduit member pivotally connected at one of its ends to the other end of the inner conduit member for movement about a second horizontal axis, counterbalance means connected to said inner conduit member for counterbalancing the dead weight of both said inner and outer conduit members, and a mechanical drive mechanism carried by said mounting means and connected to said outer conduit member for changing the attitude of said outer conduit member with respect to said inner conduit member, said drive mechanism being operable throughout its full range of operation independently of movement of the inner conduit member said drive mechanism transferring to said mounting means the torque about said second horizontal axis due to the attitude of said outer conduit member.

6. Apparatus for conveying fluid from one fluid handling means to another, comprising a rigid inner conduit member, means mounting the inner conduit member for pivotal movement about a horizontal axis adjacent one end thereof, a rigid outer conduit member pivotally connected at one of its ends to the other end of the inner conduit member for movement of said outer conduit member relative to the inner conduit member about a horizontal axis, a drive mechanism connected between said mounting means and said outer conduit member for changing the attitude of said outer conduit member with respect to said inner conduit member including a first sheave rotatable about the same axis as said outer conduit member and fixed to said outer conduit member, a second sheave concentric with the horizontal axis of pivotal movement of the inner conduit member, cable means fixed to said first sheave and engaged with said second sheave, and means for moving said cable means independently of movement of said inner conduit member to rotate said first sheave to effect movement of said outer conduit member to any position within its full range of movement relative to the inner conduit member.

7. Apparatus for conveying fluid from one fluid handling means to another, comprising a rigid inner conduit member, means mounting the inner conduit member for pivotal movement about a vertical axis and about a horizontal axis, both of said axes being adjacent one end of said inner conduit member, a rigid outer conduit member pivotally connected at one of its ends to the other end of the inner conduit member for movement of said outer conduit member relative to the inner conduit member about a horizontal axis, a drive mechanism connected between said mounting means and said outer conduit member for changing the attitude of said outer conduit member with respect to said inner conduit member including a first sheave rotatable about the same axis as said outer conduit member and fixed to said outer conduit member, a second sheave concentric with and rotatable about the horizontal axis of rotation of the inner conduit member, cable means fixed to said first sheave and trained around said second sheave, and winch means for moving said cable means to rotate said first sheave to effect movement of said outer conduit member.

8. Apparatus for conveying fluid from one fluid handling means to another, comprising a rigid inner conduit member, means mounting the inner conduit member for pivotal movement about a first horizontal axis adjacent one end of said conduit member, a rigid outer conduit member pivotally connected at one of its ends to the other end of said inner conduit member for movement of said outer conduit member relative to the inner conduit member about a second horizontal axis, a drive mechanism connected between said mounting means and said outer conduit member for changing the attitude of the outer conduit member with respect to the inner conduit member including a first sheave concentric with said first horizontal axis, a second sheave rotatable about said second horizontal axis and fixed to said outer conduit member, means securing said first sheave to prevent rotation thereof, and cable means fixed to said first sheave and to said second sheave, said cable means including fluid operated means connected thereinto for rotating said second sheave to effect movement of said outer conduit member.

9. Apparatus for conveying fluid from one fluid handling means to another, comprising a rigid inner conduit member, means mounting said conduit member for pivotal movement about vertical and horizontal axes adjacent one end of said conduit member, a rigid outer conduit member pivotally connected at one of its ends to the other end of the inner conduit member for movement of the outer conduit member relative to the inner conduit member about a second horizontal axis, a drive mechanism connected between said mounting means and the outer conduit member for changing the attitude of said outer conduit member with respect to the inner conduit member including a first sheave rotatable about said second horizontal axis and fixed to said outer conduit member, a second sheave concentric with and rotatable about said horizontal axis of pivotal movement of the inner conduit member, cable means fixed to said first sheave and to said second sheave, and fluid operated means for rotating said second sheave to move said cable means and thereby rotate said first sheave and effect movement of said outer conduit member.

10. Apparatus for conveying fluid from one fluid handling means to another, comprising a rigid inner conduit member, means mounting one end of said conduit member for pivotal movement about a horizontal axis, a rigid outer conduit member connected to the other end of the inner conduit member for pivotal movement relative to the inner conduit member about a second horizontal axis, counterbalance means connected to said inner conduit member for counterbalancing the dead weight of said inner and outer conduit members, a drive mechanism connected between said mounting means and the outer conduit member and operable throughout its full range of operation independently of movement of said inner conduit member to change the attitude of said outer conduit member with respect to the inner conduit member including a first sheave rotatable about said second horizontal axis and fixed to said outer conduit member, a second sheave concentric with said axis of pivotal movement of the inner conduit member, cable means fixed to said first sheave and trained around said second sheave, and means for moving said cable means to rotatable said first sheave and thereby effect movement of said outer conduit section, said sheaves and cables transferring to said mounting means the torque about said second horizontal axis caused by the attitude of said outer conduit member.

11. Apparatus for conveying fluid from one fluid handling means to another, comprising a rigid inboard tube, means mounting said inboard tube for pivotal movement about a first horizontal axis, a rigid outboard tube pivotally connected to the inboard tube for movement relative to the inboard tube about a second horizontal axis, a mast fixed to said mounting means, a pulley rotatably mounted on said mast, a first winch means mounted on said mast, cable means on said first winch means passing over said pulley and connected to said inboard tube for counterbalancing the dead weight of said inboard and outboard tubes, a drive mechanism connected between said mounting means and the outboard tube for changing the attitude of said outboard tube with respect to said inboard tube including a first sheave rotatable about second horizontal axis and fixed to the outboard tube, a second sheave concentric with said first horizontal axis, cable means fixed to said first sheave and trained around said second sheave, and a second winch means mounted on said mast for moving said cable means to rotate said first sheave and thereby effect movement of said outboard tube, said sheaves and cables transferring to said second winch means the torque about said second horizontal axis caused by the attitude of said outboard tube.

12. Apparatus for conveying fluid from one fluid handling means to another, comprising a rigid tubular inboard member, means mounting said inboard member for pivotal movement about a horizontal axis, a rigid tubular outboard member connected to the inboard member for pivotal movement relative thereto about a horizontal axis, counterbalance means connected to said inboard member for counterbalancing the dead weight of said inboard and outboard members, a drive mechanism connected between said mounting means and said outboard member for changing the attitude of said outboard member with respect to said inboard member including a first sheave rotatable about the same axis as said outboard member and fixed to said outboard member, a second non-rotatable sheave concentric with the axis of pivotal movement of the inboard member, and cable means fixed to said first sheave and to said second sheave, said cable means including fluid operated means connected thereinto for rotating said first sheave to thereby effect movement of said outboard member, said sheaves and cables transferring to said mounting means the torque about said axis of pivotal movement of the outboard member caused by the attitude of said outboard member.

13. Apparatus for conveying fluid from one fluid handling means to another, comprising a rigid tubular inboard member, means mounting said inboard member for pivotal movement about a first horizontal axis, a rigid tubular outboard member connected to the inboard member for pivotal movement relative to the inboard member about a horizontal axis, counterbalance means connected to said inboard member for counterbalancing the dead weight of said inboard and outboard members, and a drive mechanism connected between said mounting means and said outboard member for changing the attitude of said outboard member with respect to said inboard member, said drive mechanism including a first sheave rotatable about the same axis as said outboard member and fixed to said outboard member, a second sheave concentric with said first horizontal axis, cable means trained around both of said sheaves, and fluid operated means comprising a cylinder mounted on said mounting means and a piston operable in said cylinder and connected to said second sheave for rotating said second sheave to move said cable means and thereby rotate said first sheave to effect movement of said outboard member, said sheaves and cables transferring to said mounting means the torque about said axis of pivotal movement of the outboard member caused by the attitude of said outboard member.

14. An apparatus which comprises in combination: a support base; an inner boom arm pivotally connected to the support base for elevational movement relative to the base; and outer boom arm pivotally connected to the inner boom arm for elevational movement with respect to and independently of the elevational movement of the inner arm; first means to substantially counterbalance the inner and the outer boom arms in all positions of said arms; and second means including means mounted for rotation in response to elevational movement of the outer boom arm and drive means associated with said rotating means to change the attitude of the outer boom arm with respect to the inner boom arm.

15. An apparatus which comprises in combination: a support base; an inner boom arm pivotally connected to the support base for elevational movement about an inner axis; an outer boom arm pivotally connected to the inner boom arm for elevational movement with respect to the inner arm about an outer axis, said outer arm being elevationally movable independently of the elevational movement of the inner arm, said inner and outer arms thereby establishing a loading moment about said inner axis; means imparting an opposing moment to said inner arm which opposing moment is opposite and substantially equal to said loading moment, said outer arm exerting a turning moment about said outer axis; and means including a portion mounted for rotation simultaneously with said elevational movement of the outer arm and drive means associated with said rotatable portion that imparts a counteracting moment to the outer arm which is opposite and substantially equal to said turning moment.

16. In a fluid transferring apparatus, an inner boom pivoted for elevational movement, an outer boom pivoted on the inner boom for elevational movement relative to the inner boom, an outer control member rigid with the outer boom and extending radially from the pivot axis between said inner and outer booms, an inner control member, means mounting the inner control member so that it projects radially outward from and is rotatable about an inner axis substantially parallel to said pivot axis, means interconnecting said inner and outer control members so that said outer boom and inner control member move in unison and so that the outer boom imposes a turning moment on the inner member, and means for imposing a turning moment on said inner control member that opposes the turning moment exerted by said outer boom on said inner member.

17. In a fluid transferring apparatus, a support, an inner boom pivoted on the support for elevational movement about a substantially horizontal inner axis, an outer boom pivoted on the inner boom for elevational movement about a substantially horizontal outer axis, an outer control member rigid with the outer boom and extending radially from said outer axis, an inner control member, means mounting the inner control member on the support so that the inner member projects radially outward from and is rotatable about said inner axis, means interconnecting said inner and outer control members so that said outer boom and inner control member move in unison and so that the outer boom is capable of imposing a predetermined turning moment on said inner control member, and means for imposing a counteracting turning moment on said inner control member that opposes said predetermined moment.

18. In a fluid transferring apparatus, rigid inner and outer conduits each having an inner end and an outer end, means mounting the inner end of the inner conduit for swinging movement of the inner conduit about a predetermined inner axis, means for connecting the inner end of the inner conduit to a fluid receptacle, means mounting the inner end of the outer conduit on the outer end of the inner conduit for swinging movement of the outer conduit relative to the inner conduit about an outer axis, a driven member connected to the outer conduit concentric with said outer axis, drive means engaging the driven member and extending along the inner conduit, and powered means positioned alongside the inner conduit and connected to the drive means for imparting turning movement to the driven member thereby to swing the outer conduit about said outer axis.

19. The apparatus of claim 18 wherein said driven member is a sheave, wherein said drive means is a cable, and wherein said powered means includes hydraulic cylinder-piston units.

20. The apparatus of claim 18 wherein said inner axis is substantially horizontal, wherein said inner and outer conduits exert a turning moment about said inner axis, and wherein means is provided for counteracting said turning moment.

References Cited

UNITED STATES PATENTS

| | | | |
|---|---|---|---|
| 3,073,343 | 1/1963 | Mowell et al. | 137—615 |
| 3,114,392 | 12/1963 | Harper | 141—387 X |
| 1,429,262 | 9/1922 | Wertz | 137—615 X |
| 1,478,925 | 12/1923 | Steed | 137—615 |
| 2,250,227 | 7/1941 | Kiel | 137—615 |
| 2,927,607 | 3/1960 | Bily | 137—615 |
| 2,980,150 | 4/1961 | Bily | 137—615 X |

M. CARY NELSON, *Primary Examiner.*

S. SCOTT, *Examiner.*